US008005238B2

(12) United States Patent
Tashev et al.

(10) Patent No.: US 8,005,238 B2
(45) Date of Patent: Aug. 23, 2011

(54) ROBUST ADAPTIVE BEAMFORMING WITH ENHANCED NOISE SUPPRESSION

(75) Inventors: Ivan Tashev, Kirkland, WA (US); Alejandro Acero, Bellevue, WA (US); Byung-Jun Yoon, Pasadena, CA (US)

(73) Assignee: Microsoft Corporation, Redwood, WA (US)

( * ) Notice: Subject to any disclaimer, the term of this patent is extended or adjusted under 35 U.S.C. 154(b) by 1160 days.

(21) Appl. No.: 11/689,628

(22) Filed: Mar. 22, 2007

(65) Prior Publication Data
US 2008/0232607 A1 Sep. 25, 2008

(51) Int. Cl.
H04B 15/00 (2006.01)
(52) U.S. Cl. ....... 381/94.2; 381/92; 381/94.1; 381/94.3; 367/118; 367/119; 704/226; 704/233
(58) Field of Classification Search .............. 381/91–92, 381/122, 94.1–94.3; 704/226, 233; 367/61, 367/103, 118–119, 138
See application file for complete search history.

(56) References Cited

U.S. PATENT DOCUMENTS

| 5,493,307 | A | 2/1996 | Tsijimoto |
| 6,771,986 | B1 | 8/2004 | Oh |
| 7,035,415 | B2 | 4/2006 | Belt et al. |
| 7,206,418 | B2* | 4/2007 | Yang et al. ........ 381/92 |
| 7,206,421 | B1 | 4/2007 | Taenzer |
| 7,254,241 | B2* | 8/2007 | Rui et al. ........ 381/92 |
| 7,626,889 | B2 | 12/2009 | Seltzer et al. |
| 7,689,248 | B2* | 3/2010 | Valve et al. ........ 455/556.1 |
| 7,752,040 | B2 | 7/2010 | Tashev et al. |
| 7,831,036 | B2* | 11/2010 | Beaucoup et al. ....... 379/406.08 |
| 2003/0026437 | A1 | 2/2003 | Janse et al. |
| 2004/0001598 | A1 | 1/2004 | Balan et al. |
| 2004/0170284 | A1 | 9/2004 | Janse et al. |
| 2005/0141731 | A1 | 6/2005 | Hamalainen |
| 2005/0149320 | A1 | 7/2005 | Kajala et al. |
| 2005/0195988 | A1 | 9/2005 | Tashev et al. |
| 2006/0133622 | A1 | 6/2006 | Chen |
| 2006/0147054 | A1 | 7/2006 | Buck et al. |
| 2006/0171547 | A1 | 8/2006 | Lokki et al. |
| 2006/0286955 | A1 | 12/2006 | Yoshida et al. |
| 2007/0076898 | A1* | 4/2007 | Sarroukh et al. ........ 381/92 |

(Continued)

FOREIGN PATENT DOCUMENTS
WO WO-2005106841 A1 11/2005

OTHER PUBLICATIONS

Claesson, I., S. Nordholm, A spatial filtering approach to robust adaptive beamforming, IEEE Trans. on Antennas and Propagation, Sep. 1992, pp. 1093-1096, vol. 40, No. 9.

(Continued)

Primary Examiner — Devona E Faulk
Assistant Examiner — Disler Paul
(74) Attorney, Agent, or Firm — Lyon & Harr, LLP; Katrina A. Lyon

(57) ABSTRACT

A novel adaptive beamforming technique with enhanced noise suppression capability. The technique incorporates the sound-source presence probability into an adaptive blocking matrix. In one embodiment the sound-source presence probability is estimated based on the instantaneous direction of arrival of the input signals and voice activity detection. The technique guarantees robustness to steering vector errors without imposing ad hoc constraints on the adaptive filter coefficients. It can provide good suppression performance for both directional interference signals as well as isotropic ambient noise.

20 Claims, 5 Drawing Sheets

U.S. PATENT DOCUMENTS

2007/0150268 A1    6/2007    Acero et al.

OTHER PUBLICATIONS

Cox, H., R. M. Zeskind, and M. M. Owen, Robust adaptive beamforming, IEEE Trans. on Acoustics, Speech and Signal Processing, 1987, pp. 1365-1376, vol. 35, No. 10.

Godara, L. C., Application of antenna arrays to mobile communications II. Beam-forming and direction-of-arrival considerations, Proceedings of the IEEE, Aug. 1997, pp. 1195-1245, vol. 85, No. 8, Institute of Electrical and Electronics Engineers, New York, NY.

Herbordt, W., W. Kellermann, Computationally efficient frequency-domain robust generalized sidelobe canceller, IEEE Workshop on Acoustic Echo and Noise Control (IWAENC), Sep. 2001, pp. 51-54, Darmstadt, Germany.

Hoshuyama, O., A. Sugiyama, and A. Hirano, A robust adaptive beamformer for microphone arrays with a blocking matrix using constrained adaptive filters, IEEE Trans. Signal Processing, vol. 47, No. 10, pp. 2677-2684, Oct. 1999.

Malvar, H. S., A modulated complex lapped transform and its applications to audio processing, Proc. ICASSP, Mar. 1999, pp. 1421-1424.

Sohn, J., N. S. Kim, W. Sung, A statistical model-based voice activity detection, IEEE Signal Processing Letters, Jan. 1999, pp. 1-3, vol. 6, No. 1.

Tashev, I., A. Acero, Microphone array post-processor using instantaneous direction of arrival, Int'l Workshop on Acoustic, Echo and Noise Control, IWAENC 2006, Sep. 2006, Paris, France.

Ivan Tashev, U.S. Appl. No. 11/750,319, May 17, 2007.

Ivan Tashev, U.S. Office Action, U.S. Appl. No. 11/750,319, Feb. 3, 2011.

* cited by examiner

ROBUST ADAPTIVE BEAMFORMING WITH ENHANCED NOISE SUPPRESSION

BACKGROUND

Microphone arrays have been widely studied because of their effectiveness in enhancing the quality of the captured audio signal. The use of multiple spatially distributed microphones allows spatial filtering, filtering based on direction, along with conventional temporal filtering, which can better reject interference signals. This results in an overall improvement of the captured sound quality of the target or desired signal.

Beamforming operations are applicable to processing the signals of a number of arrays, including microphone arrays, sonar arrays, directional radio antenna arrays, radar arrays, and so forth. For example, in the case of a microphone array, beamforming involves processing output audio signals of the microphones of the array in such a way as to make the microphone array act as a highly directional microphone. In other words, beamforming provides a "listening beam" which points to, and receives, a particular sound source while attenuating other sounds and noise, including, for example, reflections, reverberations, interference, and sounds or noise coming from other directions or points outside the primary beam. Pointing of such beams is typically referred to as beamsteering. A typical beamformer employs a set of beams (i.e., beamforming) that cover a desired angular space range in order to better capture the target signal.

Various microphone array processing algorithms have been proposed to improve the quality of the target signal. The generalized sidelobe canceller (GSC) architecture has been especially popular. The GSC is an adaptive beamformer that keeps track of the characteristics of interfering signals and then attenuates or cancels these interfering signals using an adaptive interference canceller (AIC). This greatly improves the target signal, the signal one wishes to obtain. However, if the actual direction of arrival (DOA) of the target signal is different from the expected DOA, a considerable portion of the target signal will leak into the adaptive interference canceller, which results in target signal cancellation and hence a degraded target signal.

In order to avoid target signal cancellation, a number of methods have been proposed to make such a side lobe cancelling system more robust to steering vector errors. A robust GSC (RGSC) has been proposed which uses an adaptive blocking matrix with coefficient-constrained adaptive filters, which prevents the target signal from leaking into the adaptive interference canceller. More specifically, the RGSC takes the outputs from the microphone array and inputs these into a fixed beamformer that directs a beam toward the desired signal. The beamformer output contains the enhanced signal originating from the pointed direction which is used as a reference signal by the adaptive blocking matrix. The adaptive blocking matrix adaptively subtracts the reference signal from each channel input and provides the interference signals. In order to suppress only those signals that originate from a specific tracking region, the adaptive filter coefficients of the adaptive blocking matrix are constrained on the maximum allowed deviation between the expected DOA and the actual DOA. The interference signals obtained from the adaptive blocking matrix are passed to an adaptive interference canceller which removes the interference signal components from the beamformer output. This minimizes undesirable target signal cancellation. In addition to this, the AIC uses norm-constrained adaptive filters that can further improve the robustness against target signal cancellation. This adaptive beamformer is robust to DOA errors without significant degradation in the interference rejection capability. A similar RGSC has been implemented in frequency-domain, with a comparable performance at a lower computational cost.

Although the above-described RGSCs are good at rejecting directional interference signals (such as "jammer" signals), their noise suppression capability is not satisfactory under the conditions of practically isotropic ambient noise. Therefore these algorithms are not particularly suitable for noisy environments such as the automotive environment or reverberant environments such as offices or conference rooms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present adaptive beamforming technique provides enhanced noise suppression capability. The technique uses the output of a generic beamformer and incorporates the sound-source presence probability into an adaptive blocking matrix which computes any interference in the input signal for purposes of cancelling it using an adaptive interference canceller. In one embodiment the technique estimates the presence probability of the input signals, or sound-source presence probability, based on an instantaneous direction of arrival (IDOA) and per frequency bin voice activity detection, which is incorporated into the adaptive beamforming matrix.

The technique guarantees robustness to beamsteering errors without imposing ad hoc constraints on the adaptive filter coefficients of the adaptive blocking matrix. It can provide good suppression performance for both directional interference signals as well as isotropic ambient noise.

It is noted that while the foregoing limitations in existing sensor array noise suppression schemes described in the Background section can be resolved by a particular implementation of the present adaptive beamforming technique, this is in no way limited to implementations that just solve any or all of the noted disadvantages. Rather, the present technique has a much wider application as will become evident from the descriptions to follow.

In the following description of embodiments of the present disclosure reference is made to the accompanying drawings which form a part hereof, and in which are shown, by way of illustration, specific embodiments in which the technique may be practiced. It is understood that other embodiments may be utilized and structural changes may be made without departing from the scope of the present disclosure.

DESCRIPTION OF THE DRAWINGS

The specific features, aspects, and advantages of the disclosure will become better understood with regard to the following description, appended claims, and accompanying drawings where:

DETAILED DESCRIPTION

1.0 The Computing Environment

Before providing a description of embodiments of the present Adaptive beamforming technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 1:
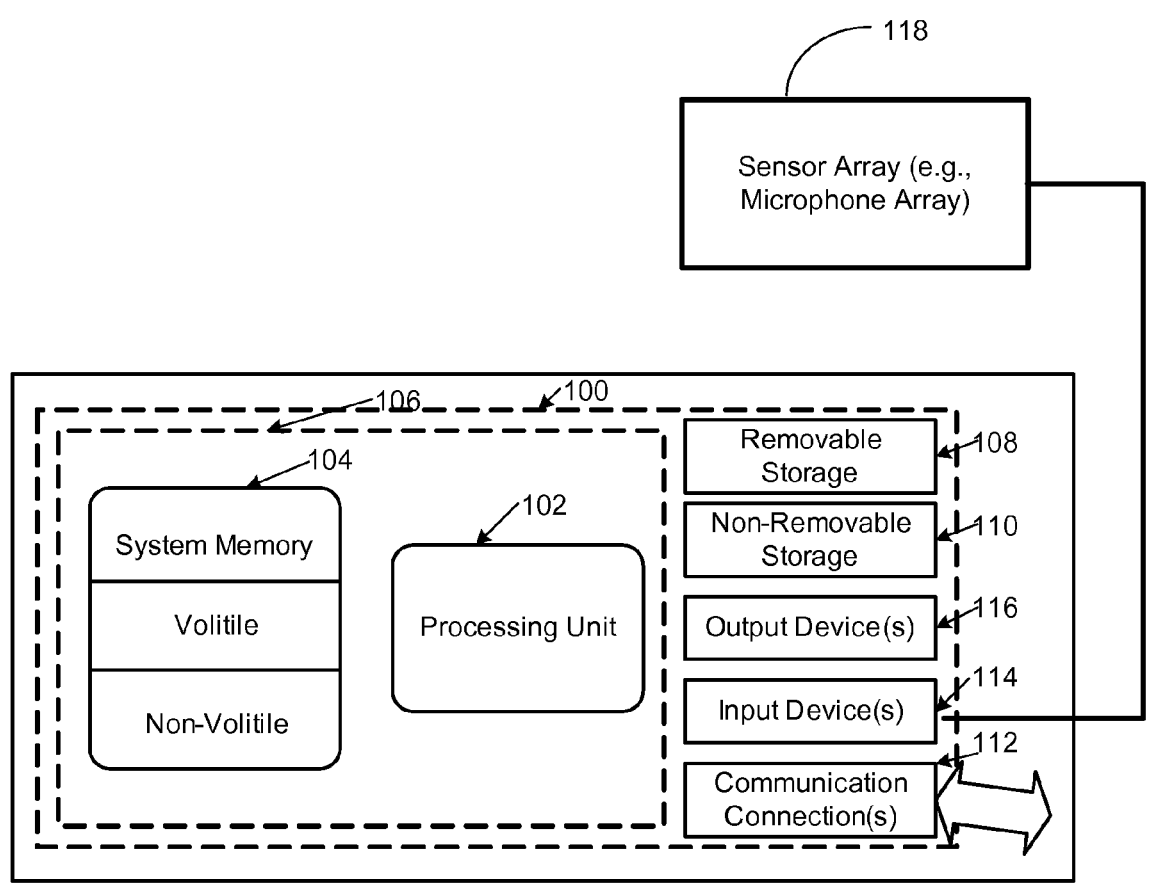
FIG. 1 is a diagram depicting a general purpose computing device constituting an exemplary system for a implementing a component of the present adaptive beamforming technique.

FIG. 1 illustrates an example of a suitable computing system environment. The computing system environment is only one example of a suitable computing environment and is not intended to suggest any limitation as to the scope of use or functionality of the present adaptive beamforming technique. Neither should the computing environment be interpreted as having any dependency or requirement relating to any one or combination of components illustrated in the exemplary operating environment. With reference to FIG. 1, an exemplary system for implementing the present adaptive beamforming technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 has at least one microphone or similar sensor array 118 and may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here.

The present adaptive beamforming technique may be described in the general context of computer-executable instructions, such as program modules, being executed by a computing device. Generally, program modules include routines, programs, objects, components, data structures, and so on, that perform particular tasks or implement particular abstract data types. The present adaptive beamforming technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present adaptive beamforming technique.

2.0 Adaptive Beamforming Technique

The present adaptive beamforming technique provides enhanced noise suppression capability. The technique incorporates the sound-source presence probability of a target signal coming from a given direction into an adaptive blocking matrix which computes interference signals. This sound source presence in the desired region may be estimated based on the instantaneous direction of arrival of the input signals and voice activity detection. Once the interference signals are determined an adaptive interference canceller then can cancel the interference from the target signal.

2.1 Context: Robust Generalized Sidelobe Canceller

In order to fully appreciate the present adaptive beamforming technique and explanation of a known robust generalized sidelobe canceller (GSC) is helpful.

Figure 2:
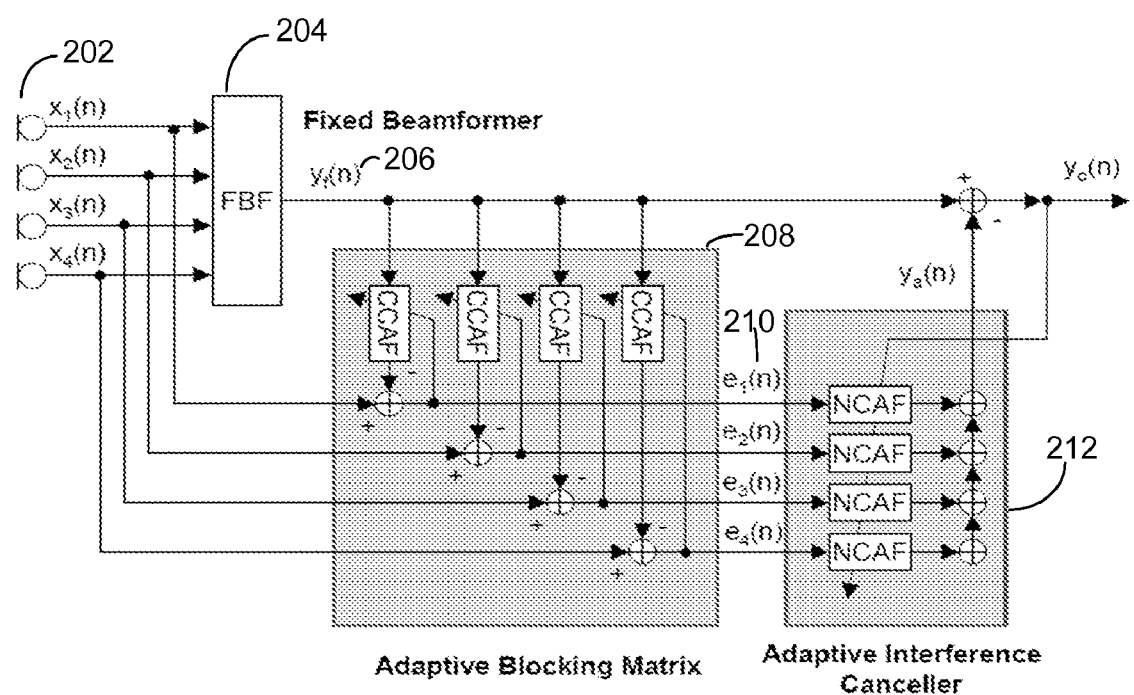
FIG. 2 is a diagram depicting a robust generalized side lobe canceller.

One structure of a known robust GSC is illustrated in FIG. 2, for a four-element microphone array. Initially, the four microphone inputs $x_i(n)$ ($i=1, \ldots, 4$) 202 go through the fixed beamformer (FBF) 204 that directs the beam towards the expected direction of arrival (DOA). The beamformer output $y_f(n)$ 206 contains the enhanced signal originating from the pointed direction, which is used as a reference by an adaptive blocking matrix 208. The adaptive blocking matrix 208 adaptively subtracts the signal of interest, represented by the reference signal $y_f(n)$ 206, from each channel input $x_i(n)$ 202, and provides the interference signals $e_i(n)$ 210. In order to suppress only those signals that originate from a specific tracking region, the adaptive filter coefficients of the adaptive block matrix 208 are constrained within predefined boundaries. These boundaries are specified based on the maximum allowed deviation between the expected DOA and the actual DOA.

The interference signals $e_i(n)$ 210, obtained from the adaptive blocking matrix 208, are passed to an adaptive interference canceller 212, which adaptively removes the signal components that are correlated to the interference signals from the beamformer output $y_f(n)$ 206. The norm of the filter coefficients in the adaptive interference canceller 212 is constrained to prevent them from growing excessively large. This minimizes undesirable target signal cancellation, when the target signal leaks into the adaptive interference canceller 212, further improving the robustness of the system.

Ideally, the beamformer 206 output $y_f(n)$ should consist of the target signal, while the adaptive blocking matrix outputs 210 contain only the interference part in the original inputs. This holds more or less true when the interference is a point source whose direction is sufficiently separated from the direction of the target signal. However, this assumption breaks down under conditions of isotropic ambient noise, where the beamformer output 206 contains a considerable amount of noise. In such cases the adaptive blocking matrix 208 tends to subtract the noise from the input signal, while still leaving a significant portion of the target signal behind. Therefore, the interference signals $e_i(n)$ will have less noise and more from the target signal, which reduces the noise suppression capability of the adaptive interference canceller 212 and leads to target-signal cancellation, degrading the quality of the final output of the RGSC.

2.2 Exemplary Architecture of the Present Adaptive Beamforming Technique.

Figure 3:
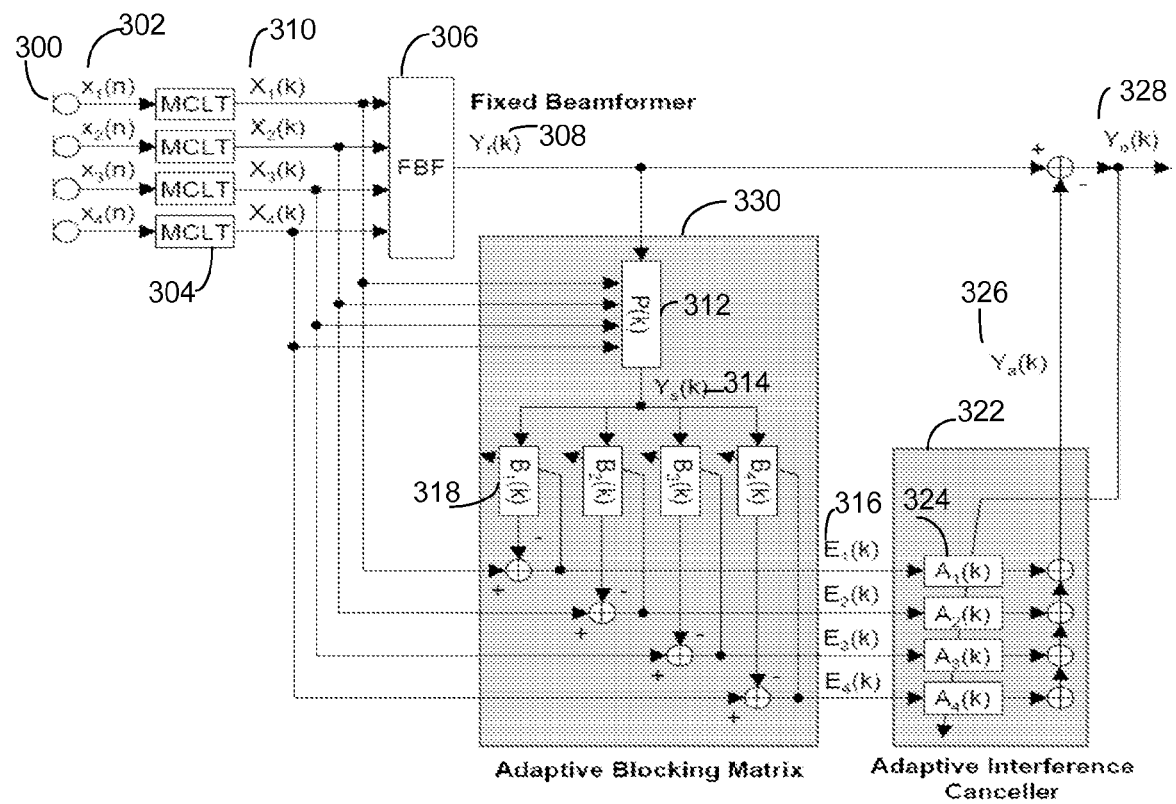
FIG. 3 is a diagram depicting one exemplary architecture of the present adaptive beamforming technique.

One exemplary architecture of the present adaptive beamforming technique 300 is shown in FIG. 3. The structure of this embodiment of the present adaptive beamformer shown in FIG. 3 employs a four-element microphone array 300. The architecture of the present adaptive beamforming technique is not limited to this configuration, as many types of microphone arrays can be employed with the present technique.

2.2.1 Conversion Into the Frequency Domain

The beam design operations described herein operate in a digital domain rather than directly on the analog signals received directly by the microphone array. Therefore, the audio signals captured by the microphone array 300 are first digitized using conventional A/D conversion techniques, breaking the audio signals into time domain samples. One embodiment of the adaptive beamforming technique first converts the time-domain signal $x_i(n)$ to frequency-domain using a converter 304. In one embodiment this converter uses a modulated complex lapped transform (MCLT) that provides good separation between frequency-bands of the input signals in an efficient manner. One can denote the MCLT as $X_i^l(k)$, where k is the frequency bin and l is the index of the time-frame. It should be noted that many other types of transforms can be used to convert from the time domain to the frequency domain, such as Fast Fourier Transforms (FFT), DFT filter banks and the like. The input signals in the frequency domain 310 are input into a beamformer 306. The beamformer output 308 represents the optimal solution for capturing an audio signal at that target point using the total microphone array input. It is a weighted sum of the input signals in the frequency domain:

$$Y_f^l(k) = \sum_i W_i(k) X_i^l(k). \quad (1)$$

where $W_i(k)$ is a weight matrix. The set of vectors $W_i(k)$ is an N×M matrix, where N is the number of MCLT frequency bins in a given audio frame and M is the number of microphones.

2.2.2 Adaptive Blocking Matrix

In general, a beamformer output is passed to an adaptive blocking matrix to compute any interference in the input signals and then cancel it from the input signals using an adaptive interference canceller. In the previously discussed robust GSC, the motivation for passing the beamformer output $Y_f^l(k)$ to the adaptive blocking matrix is to use it as a reference signal that closely resembles the desired target signal. The adaptive blocking matrix should preferably subtract only the portions in the input signals that are correlated to the "desired signal". Based on this reasoning, the adaptive beamforming technique estimates the desired signal by taking the product of the beamformer output $Y_f^l(k)$ 308 and the probability $P^l(k)$ 312 that the beamformer output contains the desired signal originating from the target region. (The computation of $P^l(k)$ 312 will be discussed in more detail later.) Hence, the estimated desired signal 314 can be described by:

$$Y_s^l(k) = P^l(k) Y_f^l(k). \quad (2)$$

The adaptive blocking matrix 330 uses the estimated desired signal $Y_s^l(k)$ 314 as the reference signal, instead of the beamformer output $Y_f^l(k)$ used in the previously described robust GSC, and adaptively subtracts the components that are correlated to the estimated desired signal $Y_s^l(k)$ 314 from the input signals 310 in the frequency domain to obtain the interference portion of the input signals. The adaptive blocking matrix outputs $E_i^l(k)$ 316 can be described by:

$$E_i^l(k) = X_i^l(k) - B_i^l(k) Y_s^l(k). \quad (3)$$

After the subtraction, the adaptive blocking matrix outputs $E_i^l(k)$ 316 contain the interference signals that come from undesirable directions and the background noise originating from the target region.

The adaptive filter coefficients $B_i^l(k)$ 318 of the adaptive blocking matrix 330 are updated (in one embodiment, using the normalized least mean squares (NLMS) algorithm). The adaptive filter coefficients 318 can then be described by:

$$B_i^{l+1}(k) = B_i^l(k) + \mu_b^l(k) Y_s^{l*}(k) E_i^l(k), \quad (4)$$

where the normalized step size $\mu_b^l(k)$ at the l-th frame is computed as follows:

$$\mu_b^l(k) = \mu_b [\epsilon_b + S_f^l(k)]^{-1}. \quad (5)$$

$\mu_b(k)$ is a fixed step size parameter and $\epsilon_b$ is a small number that is used to prevent $\mu_b^l(k)$ from becoming too large. $S_f^l(k)$ is the power estimate of the beamformer output in the k-th frequency bin at the l-th frame $$S_f^{l+1}(k) = \lambda_b S_f^l(k) + (1 - \lambda_b) |Y_f^l(k)|^2. \quad (6)$$

The parameter $\lambda_b$ can be used to control the update speed.

2.2.3 Estimating the Sound-Source Presence Probability in Order to Determine Desired Signal.

In order to determine an estimate of the desired signal, the sound-source presence probability is determined. The variable $P^l(k)$ 312, the sound source presence probability, can be defined as the probability that the signal of interest originating from the target region is presented in the k-th frequency bin of the beamformer output $Y_f^l(k)$ at time-frame l. In one embodiment this probability 312 can be computed using the spatial probability, $P_s^l(k)$, and a speech presence probability, $P_v^l(k)$, as follows:

$$P^l(k) = P_s^l(k) P_v^l(k). \quad (7)$$

The first term, $$P_s^\ell(k) = \int_{\theta_T-\delta_\theta}^{\theta_T+\delta_\theta} p_k^\ell(\theta)\,d\theta,$$

the spatial probability, is the probability that the signal component in the k-th frequency bin originates from inside the target tracking region $[\theta_T-\delta_\theta, \theta_T+\delta_\theta]$, where $\theta_T$ is the expected direction of arrival (DOA) of the target signal and $\delta_\theta$ is the maximum allowable DOA error. In one embodiment, the adaptive beamformer technique estimates $p_k^l(\theta)$ using the method discussed in Section 3.0. It should be noted that any other method could be used to obtain this estimate. With the spatial probability $P_s^l(k)$ the adaptive beamformer technique has a direct control over the maximum allowable DOA error. Unlike the previous RGSCs described in Section 2.1, the adaptive beamformer technique does not have to impose ad hoc constraints on the adaptive blocking matrix filter coefficients, which indirectly affect the maximum target direction error.

The speech presence probability $P_v^l(k)$ in the k-th frequency bin, which is the second term in the right-hand side of equation (7), can be computed using a voice activity detector (VAD). A voice activity detector detects the presence or absence of human speech in the audio frames. Once the sound source presence probability is determined it can be used to obtain the desired signal.

2.2.4 Adaptive Interference Canceller

The adaptive interference canceller 322 removes the signal components in the beamformer output $Y_f^l(k)$ 308 that are correlated to the interference signals. First the adaptive interference canceller computes the overall interference signal by taking the weighted sum of $E_i^l(k)$ 318 using the adaptive filter coefficients $A_i^l(k)$ 324 of the adaptive interference canceller:

$$Y_a^\ell(k) = \sum_i A_i^\ell(k) E_i^\ell(k). \quad (8)$$

Then this signal $Y_a^l(k)$ 326 is subtracted from $Y_f^l(k)$ 308 to eliminate the remaining interference and noise components in the beamformer output $$Y_o^l(k) = Y_f^l(k) - Y_a^l(k). \quad (9)$$

The final output $y_o(n)$ can be obtained by taking the inverse-MCLT (IMCLT) of $Y_o^l(k)$ 328. As in the adaptive blocking matrix 330, the filter coefficients in the adaptive interference canceller 322 are updated (for example, by using a NLMS algorithm):

$$A_i^{l+1}(k) = A_i^l(k) + \mu_a^l(k) E_i^{l*}(k) Y_o^l(k) \quad (10)$$

The normalized step size $\mu_a^l(k)$ is defined as $$\mu_a^l(k) = \mu_a[\epsilon_a + S_a^l(k)]^{-1}, \quad (11)$$

where $S_a^l(k)$ is the power estimate of the interference signals $E_i^l(k)$ $$S_a^{\ell+1}(k) = \lambda_a S_a^\ell(k) + (1-\lambda_a)\sum_i |E_i^\ell(k)|^2. \quad (12)$$

2.3 Exemplary Process Employing the Present Adaptive Beamforming Technique.

Figure 4:
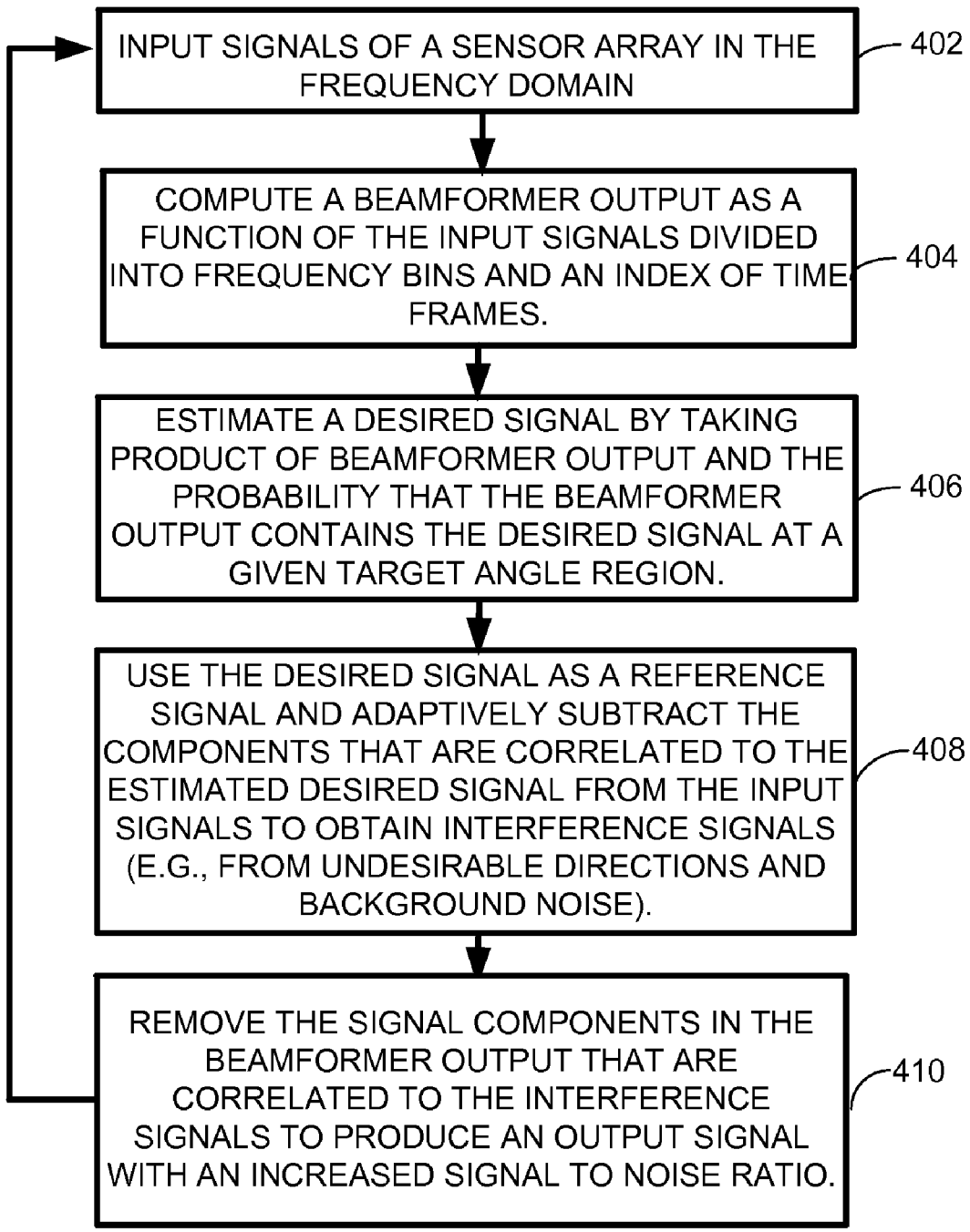
FIG. 4 is a flow diagram depicting one generalized exemplary embodiment of a process employing the present adaptive beamforming technique.

One general exemplary process employing the present adaptive beamforming technique is shown in FIG. 4. As shown in FIG. 4, box 402, signals of a sensor array in the frequency domain are input. A beamformer output is computed as a function of the input signals divided into frequency bins and an index of time frames (box 404). A desired signal is estimated by taking the product of the beamformer output and the probability that the beamformer output contains the desired signal at a given target angle region (box 406). The estimated desired signal is used as a reference signal and components that are correlated to the estimated desired signal are subtracted from the input signals to obtain interference signals (box 408). The interference signals are subtracted from the beamformer output signals to produce an output signal with an increased signal to noise ratio (box 410).

Figure 5:
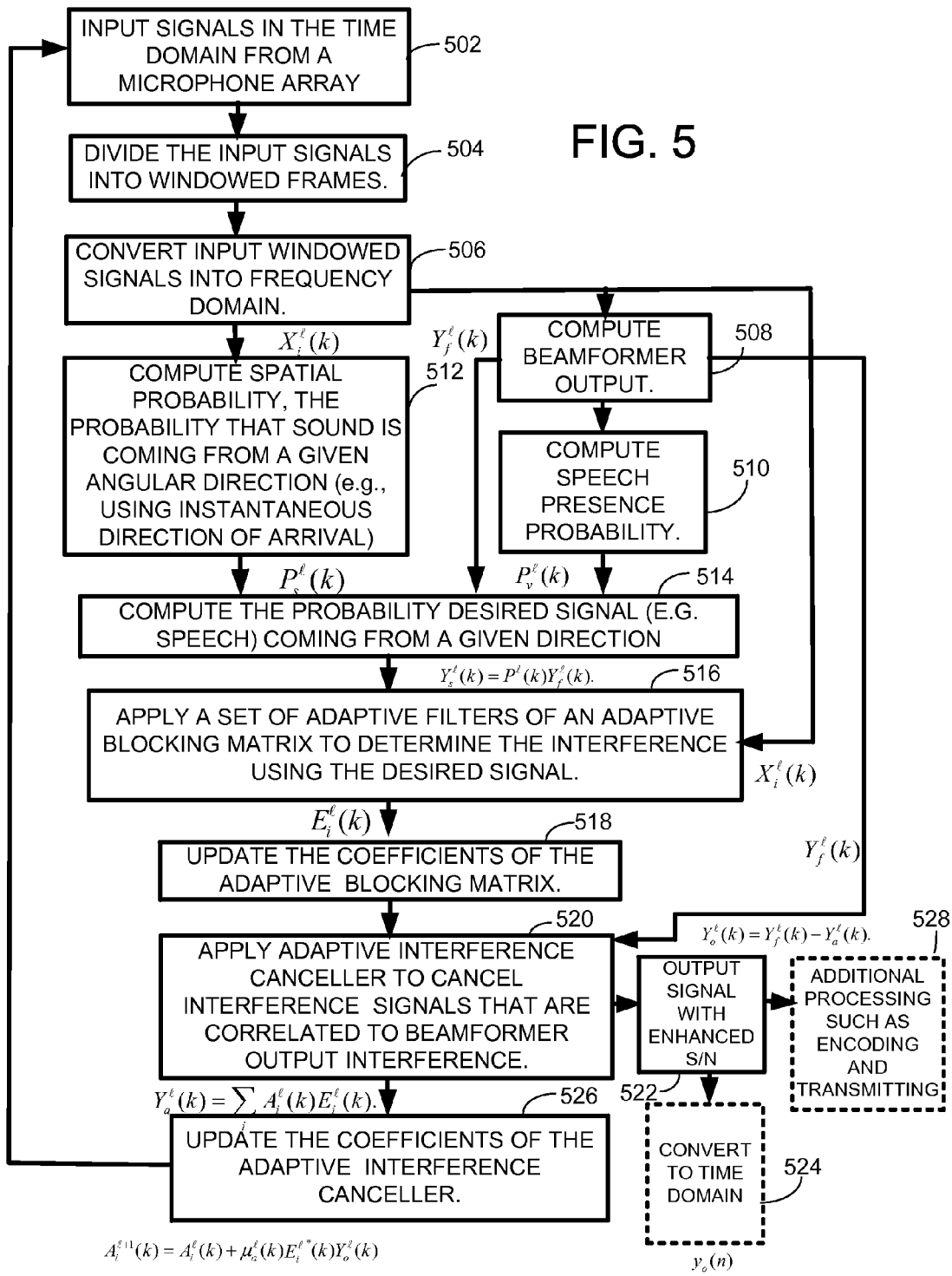
FIG. 5 is a flow diagram depicting one generalized exemplary embodiment of a process employing the present adaptive beamforming technique.

More particularly, an exemplary process employing the present adaptive beamforming technique is shown in FIG. 5. The audio signals captured by the microphone array $x_i(t)$, $i=1\div(M-1)$, where M is the number of microphones, are digitized using conventional A/D conversion techniques, breaking the audio signals into frames (boxes 502, 504). The adaptive beamforming technique then converts the time-domain signal $x_i(n)$ to frequency-domain (box 506). In one embodiment a modulated complex lapped transform (MCLT) is used, although other transforms could equally well be used. One can denote the frequency domain transform as $X_i^l(k)$, where k is the frequency bin and l is the index of the time-frame (e.g., frame).

The signals in the frequency domain, $X_i^l(k)$, are then input into a beamformer, whose output represents the optimal solution for capturing an audio signal at a target point using the total microphone array input (box 508). The beamformer output is used to compute a speech presence probability (box 510). In one embodiment this is done by using a Voice Activity Detector. Additionally, the probability that sound is coming from a given direction, the spatial probability, is computed using the input signals in the frequency domain (box 512). The spatial probability and the speech presence probability are then used to compute the sound source presence probability, the probability that the desired signal (e.g., speech) is coming from a given direction, using equation (5) previously discussed (box 514). More specifically, the sound source presence probability $P^l(k)$ is defined as the probability that the signal of interest originating from the target region is presented in the k-th frequency bin of the beamformer output $Y_f^l(k)$ at time-frame l. This probability is obtained by multiplying the probability that the signal component in the k-th frequency bin originates from inside the target tracking region $[\theta_T-\delta_\theta, \theta_T+\delta_\theta]$, where $\theta_T$ is the expected direction of arrival (DOA) of the target signal and $\delta_\theta$ is the maximum allowable DOA error, times the speech presence probability $P_v^l(k)$ in the k-th frequency bin. The sound source presence probability is then multiplied by the beamformer output to obtain an estimated desired signal.

The estimated desired signal is input to an adaptive blocking matrix so it can be used as a reference signal (box 516). The adaptive blocking matrix uses the estimated desired signal as the reference signal and adaptively subtracts the components that are correlated to the estimated desired signal from the input signals in the frequency domain. After the subtraction, the adaptive blocking matrix outputs contain the interference signals that come from undesirable directions and the background noise originating from the target region.

The adaptive filter coefficients of the adaptive blocking matrix are updated (in one embodiment, using the normalized least mean squares (NLMS) procedure) (box 518).

The adaptive interference canceller then removes the signal components in the beamformer output signals that are correlated to the interference signals (box 520). To do this the adaptive interference canceller computes the overall interference signal by taking the weighted sum of the interference signals at each frequency bin $E_i^I(k)$ using the adaptive filter coefficients $A_i^I(k)$ of the adaptive blocking matrix. Then this estimated signal is subtracted from the beamformer output in the frequency domain to eliminate the remaining interference and noise components and output a signal with an enhanced signal to noise ratio (box 522). The final output in the time domain can be obtained by taking the inverse-MCLT (IM-CLT) of $Y_o^I(k)$ (box 524). As in the adaptive blocking matrix, the filter coefficients in the adaptive interference canceller can also be updated (box 526). Other processing such as encoding and transmitting the enhanced signal can also be performed (box 528).

3.0 One Exemplary Technique of Computing Sound Source Presence Probability.

The exemplary architecture and processes discussed in the previous sections use the sound source presence probability in crafting the adaptive blocking matrix. The following paragraphs provide one method of determining the sound source presence probability, although other methods could be used.

3.1 Instantaneous Direction Of Arrival Space

One can find the Instantaneous Direction of Arrival (IDOA) for each frequency bin based on the phase differences of non-repetitive pairs of input signals. For M microphones these phase differences form a M−1 dimensional space, spanning all potential IDOA. If one defines an IDOA vector in this space as $$\Delta(f) \triangleq [\delta_1(f), \delta_2(f), \ldots, \delta_{M-1}(f)] \quad (13)$$

where $$\delta_l(f) = arg(X_0(f)) - arg(X_l(f)) \; l = \{1, \ldots, M-1\} \quad (14)$$

then the non-correlated noise will be evenly spread in this space, while the signal and ambient noise (correlated components) will lay inside a hypervolume that represents all potential positions $c = \{\phi, \theta, \rho\}$ of a sound source in real three dimensional space. For far field sound capture, this is an M−1 dimensional hypersurface as the distance is presumed approaching infinity. Linear microphone arrays can distinguish only one dimension—the incident angle, and the real space is represented by a M−1 dimensional hyperline. For each point in the real space there is a corresponding point in the IDOA space (which may be not unique). The opposite is not true: there are points in the IDOA space without corresponding point in the real space.

3.2 Presence of a Sound Source

For simplicity and without any loss of generality, a linear microphone array is considered, sensitive only to the incident angle θ-direction of arrival in one dimension. Let $\Psi_k(\theta)$ denote the function that generates the vector Δ for given θ and frequency bin k. In each frame, the $k^{th}$ bin is represented by one point $\Delta_k$ in the IDOA space. Consider a sound source at $\theta_S$ with image in IDOA at $\Delta_S(k) = \Psi_k(\theta_S)$. With additive noise, the resultant point in IDOA space will be spread around $\Delta_S(k)$:

$$\Delta_{S+N}(k) = \Delta_S(k) + \mathbb{N}(0, \lambda_{IDOA}(k)). \quad (15)$$

where $\mathbb{N}(0, \lambda_{IDOA}(k))$ is the spatial movement of $\Delta_k$ in the IDOA space, caused by the correlated and non-correlated noises.

3.3 Space Conversion

The conversion from distance to the theoretical hyperline in IDOA space to distance into the incident angle space (real world, one dimensional in this case) is given by:

$$\Upsilon_k(\theta) = \frac{\|\Delta_k - \Psi_k(\theta)\|}{\left\|\frac{d\Psi_k(\theta)}{d\theta}\right\|} \quad (16)$$

where $\|\Delta_k - \Psi_k(\theta)\|$ is the Euclidean distance between $\Delta_k$ and $\Psi_k(\theta)$ in IDOA space, $$\frac{d\Psi_k(\theta)}{d\theta}$$

are the partial derivatives, and $\Upsilon_k(\theta)$ is the distance of observed IDOA point to the points in the real world. Note that the dimensions in IDOA space are measured in radians as phase difference, while $\Upsilon_k(\theta)$ is measured in radians as units of incident angle.

3.4 Estimation of the Variance in Real Space

Analytic estimation in real-time of the probability density function for a sound source in every bin is computationally expensive. Therefore the adaptive beamforming technique estimates indirectly the variation $\lambda_k(\theta)$ of the sound source position in presence of $\mathbb{N}(0, \lambda_{IDOA}(k))$ from Eq. (15). Let $\lambda_k(\theta)$ and $\Upsilon_k(\theta)$ be a K×N matrices, where K is the number of frequency bins and N is the number of discrete values of the direction angle θ. Variation estimation goes through two stages. During the first stage a rough variation estimation matrix $\lambda(\theta, k)$ is built. If $\theta_{min}$ is the angle that minimizes $\Upsilon_k(\theta)$, only the minimum values in the rough model are updated:

$$\lambda_k^{(n)}(\theta_{min}) = (1-\alpha)\lambda_k^{(n-1)}(\theta_{min}) + \alpha \Upsilon_k(\theta_{min})^2 \quad (17)$$

where $\Upsilon$ is estimated according to Eq.(16), $$\alpha = \frac{T}{\tau_A}$$

($\tau_A$ is the adaptation time constant, T is the frame duration). During the second stage a direction-frequency smoothing filter $H(\theta, k)$ is applied after each update to estimate the spatial variation matrix $\lambda(\theta, k) = H(\theta, k) * \lambda(\theta, k)$. Here it is assumed a Gaussian distribution of the non-correlated component, which allows one to assume the same deviation in the real space towards θ.

3.5 Likelihood Estimation

With known spatial variation $\lambda_k(\theta)$ and distance $\Upsilon_k(\theta)$, the probability density for frequency bin k to originate from direction θ is given by:

$$p_k(\theta) = \frac{1}{\sqrt{2\pi\lambda_k(\theta)}} \exp\left\{-\frac{\Upsilon_k(\theta)^2}{2\lambda_k(\theta)}\right\}, \quad (18)$$

and for a given direction $\theta_S$ the likelihood is:

$$\Lambda_k(\theta_S) = \frac{p_k(\theta_S)}{p_k(\theta_{min})}, \quad (19)$$

where $\theta_{min}$ is the value which minimizes $p_k(\theta)$.

It should also be noted that any or all of the aforementioned alternate embodiments may be used in any combination desired to form additional hybrid embodiments. For example, even though this disclosure describes the present adaptive beamforming technique with respect to a microphone array, the present technique is equally applicable to sonar arrays, directional radio antenna arrays, radar arrays, and the like. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process for improving the signal to noise ratio of one or more signals from sensors of a sensor array, comprising:
   inputting signals of sensors of a sensor array in the frequency domain defined by frequency bins and a time frame index;
   computing a beamformer output as function of the input signals divided into k frequency bins and the time frame index;
   estimating a desired signal by taking the product of the beamformer output and the probability that the beamformer output contains the desired signal at a given target angle region;
   using the estimated desired signal as a reference signal and subtracting components that are correlated to the estimated desired signal from the input signals to obtain interference signals;
   subtracting the interference signals from the beamformer output to produce an output signal with an increased signal to noise ratio.

2. The computer-implemented process of claim 1 wherein the input signals of the sensor array in the frequency domain are converted from the time domain into the frequency domain prior to inputting them using a Modulated Complex Lapped Transform (MCLT).

3. The computer-implemented process of claim 1 wherein the sensors are microphones and wherein the sensor array is a microphone array.

4. The computer-implemented process of claim 1 wherein the sensors are one of:
   sonar receivers and wherein the sensor array is a sonar array;
   directional radio antennas and the sensor array is a directional radio antenna array; and
   radars and wherein the sensor array is a radar array.

5. The computer-implemented process of claim 1 wherein the probability that the beamformer output contains the desired signal at a given target angle region is computed by multiplying the probability that a signal component in a k-th frequency bin originates inside a specified tracking region by the probability that the desired signal exists in the k-th frequency bin.

6. The computer-implemented process of claim 5 wherein the specified tracking region is defined by the expected direction of arrival of the desired signal and a maximum allowed direction of arrival error.

7. The computer-implemented process of claim 5 wherein the probability that a signal component in the k-th frequency bin originates inside a specified tracking region employs an instantaneous direction of arrival for each frequency bin based on the phase differences of the input signals.

8. The computer-implemented process of claim 5 wherein the probability that the desired signal exists in the k-th frequency bin is determined using a voice activity detector.

9. A computer-implemented process for improving the signal to noise ratio of one or more signals from sensors of a sensor array, comprising:
   inputting signals from microphones of a microphone array in the frequency domain;
   computing a beamformer output;
   computing a speech presence probability that speech exists in a given frequency bin;
   computing the spatial probability that sound is coming from a given angular direction;
   computing the probability that a desired signal is coming from a given direction using the spatial probability, the speech presence probability and the beamformer output;
   applying a set of adaptive filters of an adaptive blocking matrix to determine interference in the input signals using the probability that the desired signal is coming from a given direction;
   applying an adaptive interference canceller to cancel the interference signals from the beamformer output; and
   outputting the beamformer output with an enhanced signal to noise ratio.

10. The computer-implemented process of claim 9 wherein coefficients of the adaptive filters are updated after applying the set of adaptive filters.

11. The computer-implemented process of claim 10 wherein the adaptive filters are updated using a normalized least mean squares (NLMS) process.

12. The computer-implemented process of claim 9 wherein coefficients of the adaptive interference cancellers are updated after applying the set of adaptive filters.

13. The computer-implemented process of claim 9 wherein the output signal is converted from the frequency domain to the time domain.

14. The computer-implemented process of claim 9 wherein the spatial probability is determined by using an instantaneous direction of arrival computation.

15. The computer-implemented process of claim 14 wherein the speech presence probability is computed using a voice activity detector.

16. A computer-readable storage device having computer-executable instructions stored thereon for performing the process recited in claim 9.

17. A system for improving the signal to noise ratio of a signal received from a microphone array, comprising:
   a general purpose computing device;
   a computer program comprising program modules executable by the general purpose computing device, wherein the computing device is directed by the program modules of the computer program to,
   capture audio signals in the time domain with a microphone array;
   convert the time-domain signals $x_i(n)$ to frequency-domain using a converter;
   input the signals in the frequency domain into a beamformer and computing a beamformer output wherein the beamformer output represents the optimal solution for capturing an audio signal at a target point using the total microphone array input;
   estimate a desired signal by taking the product of the beamformer output $Y_f^i(k)$ and the probability $P^i(k)$ that the beamformer output $Y_f^i(k)$ contains the desired signal originating from a target region;
   use the estimated desired signal $Y_s^i(k)$ as a reference signal and adaptively subtract the components that are correlated to the estimated desired signal $Y_s^l(k)$ from the input signals in the frequency domain using an adaptive blocking matrix to obtain the interference portion of the input signals;

update the adaptive filter coefficients $B_i^l(k)$ of the adaptive blocking matrix; and remove the signal components in the beamformer output $Y_f^l(k)$ that are correlated to the interference signals by using an adaptive interference canceller to output an enhanced beamformer output.

18. The system of claim 17 further comprising a module to convert the enhanced beamformer output into the time domain.

19. The system of claim 17 further comprising at least one module to:

encode the enhanced beamformer output;

transmit the encoded enhanced beamformer output; and transmit the enhanced beamformer output.

20. The system of claim 17 further wherein the probability $P^l(k)$ that the beamformer output $Y_f^l(k)$ contains the desired signal originating from a target region employs an Instantaneous Direction of Arrival computation.

\* \* \* \* \*